United States Patent
Ozanoglu et al.

(10) Patent No.: US 9,407,144 B2
(45) Date of Patent: Aug. 2, 2016

(54) METHOD FOR A CURRENT MODE BUCK-BOOST CONVERTER

(71) Applicant: Dialog Semiconductor GmbH, Kirchheim/Teck-Nabern (DE)

(72) Inventors: Kemal Ozanoglu, Istanbul (TR); Selcuk Talay, Istanbul (TR); Pier Cavallini, Swindon (GB); Dieter Graefje, Notzingen (DE); Andrea Acquas, Munich (DE)

(73) Assignee: Dialog Semiconductor (UK) Limited, Reading (GB)

( * ) Notice: Subject to any disclaimer, the term of this patent is extended or adjusted under 35 U.S.C. 154(b) by 63 days.

(21) Appl. No.: 14/308,795

(22) Filed: Jun. 19, 2014

(65) Prior Publication Data

US 2015/0357914 A1    Dec. 10, 2015

(30) Foreign Application Priority Data

Jun. 6, 2014   (EP) ..................................... 14368027

(51) Int. Cl.
| | | |
|---|---|---|
| H02M 3/158 | (2006.01) | |
| H02M 3/04 | (2006.01) | |
| G05F 1/575 | (2006.01) | |

(52) U.S. Cl.
CPC ............ *H02M 3/158* (2013.01); *H02M 3/1582* (2013.01); *G05F 1/575* (2013.01); *H02M 3/04* (2013.01)

(58) Field of Classification Search
CPC ........... G05F 1/575; G05F 1/656; G05F 1/10; H02M 3/1582; H02M 3/04
USPC ........................... 323/271, 222, 282, 224, 283
See application file for complete search history.

(56) References Cited

U.S. PATENT DOCUMENTS

| | | | |
|---|---|---|---|
| 6,166,527 A | 12/2000 | Dwelley et al. | |
| 2007/0075687 A1 | 4/2007 | Ishii et al. | |
| 2009/0039852 A1 | 2/2009 | Fishelov et al. | |
| 2009/0108823 A1 | 4/2009 | Ho et al. | |
| 2009/0146623 A1 | 6/2009 | de Cremoux et al. | |
| 2011/0018507 A1* | 1/2011 | McCloy-Stevens | H02M 3/1588 323/271 |
| 2011/0110122 A1* | 5/2011 | Chen ................. | H02M 3/33592 363/21.13 |

(Continued)

OTHER PUBLICATIONS

European Search Report, Nov. 26, 2014, Dialog Semiconductor GmbH, 14368027.0-1809.

(Continued)

*Primary Examiner* — Jessica Han
*Assistant Examiner* — Demetries A Gibson
(74) *Attorney, Agent, or Firm* — Saile Ackerman LLC; Stephen B. Ackerman (57) ABSTRACT

A current mode control buck-boost converter with improved performance utilizes separate buck and boost pulses. The buck-boost converter utilizes a buck/boost decision method with continuous control voltage for buck and boost mode, therefore eliminating transients in the control loop between operation modes and preventing voltage overshoots. If switching in Boost mode and the buck duty cycle is smaller than a set duty cycle, then in the next cycle Buck mode switching will occur. It is possible to track a Buck comparator output and the related duty cycle during Boost mode operation. Thus a mode change decision will only be dependent on a single input. A control loop will incorporate a single loop filter and error amplifier, wherein control voltages for Buck comparator and Boost comparator will be related.

13 Claims, 8 Drawing Sheets

(56) References Cited

U.S. PATENT DOCUMENTS

| | | | |
|---|---|---|---|
| 2011/0169466 A1* | 7/2011 | Kuan | H02M 3/1582 323/282 |
| 2011/0279098 A1* | 11/2011 | Ren | H02M 3/1582 323/234 |
| 2012/0146594 A1 | 6/2012 | Kobayashi | |
| 2012/0262142 A1* | 10/2012 | Chen | H02M 3/1582 323/284 |
| 2012/0274295 A1 | 11/2012 | Lin et al. | |
| 2013/0320949 A1 | 12/2013 | Prexl et al. | |
| 2014/0084883 A1 | 3/2014 | Tanabe | |

OTHER PUBLICATIONS

"Smooth Transition and Ripple Reduction in 4-Switch Non-Inverting Buck-Boost Power Converter for WCDMA RF Power Amplifier," by Rajarshi Paul et al., IEEE International Symposium on Circuits and Systems, 2008 ISCAS, May 18-21, 2008, pp. 3266-3269.

"Design of an Average-Current-Mode Noninverting Buck-Boost DC-DC Converter With Reduced Switching and Conduction Losses," by Chia-Ling Wei, et al., IEEE Transactions on Power Electronics, vol. 27, No. 12, Dec. 2012, pp. 4934-4943.

"A high efficiency current mode step-up/step-down DC-DC converter with smooth transition," by Yanzhao Ma, et al., 2011 IEEE 9th International Conference, Oct. 25, 2011, Found: http://ieeexplore.ieee.org/xpl/login.jsp?tp=&arnumber=6157134&ur . . . , on Dec. 5, 2013, pp. 1-4.

"Adaptive Pulse Skipping and Adaptive Compensation Capacitance Techniques in Current-ode Buck-Boost DC-DC Converters for Fast Transient Response," By Andreas Ehrhart, et al., Power Electronics and Drive Systems (PEDS), 2013 IEEE 10th International Conference , Apr. 22, 2013, Found: http://ieeexplore.ieee.org/xpl/login.jsp?tp=&arnumber=652704784ur . . . , pp. 373-378.

\* cited by examiner

FIG. 9 ated Buck and Boost pulses" using voltage mode control is disclosed by U.S. Pat. No. 6,166,527 (to Trevor W. Barcelo).

METHOD FOR A CURRENT MODE BUCK-BOOST CONVERTER

TECHNICAL FIELD

The present document relates to DC-to-DC converters. In particular, the present document relates to current mode buck-boost converters with isolated buck and boost pulses.

BACKGROUND

Figure 1:
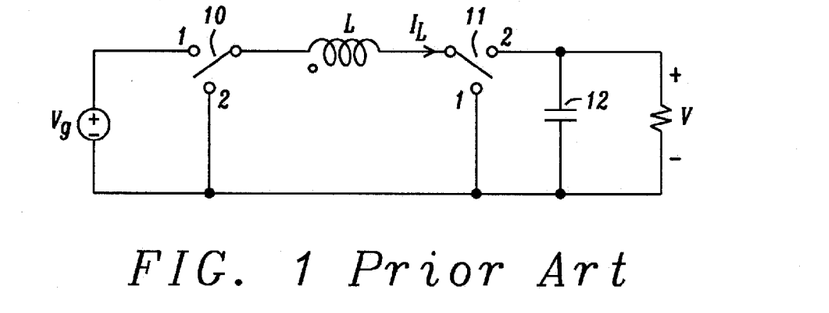

Buck-Boost converters are used in applications where the desired output voltage (e.g. 3.3V) can be lower or higher than the input voltage (e.g. Vin=2.5V-5.5V). FIG. 1 prior art gives an example of a typical buck-boost switch configuration. This configuration is called non-inverting or positive buck-boost converter as the output voltage has the same sign as the input voltage.

In basic operating principle referring to FIG. 1 prior art, when both the switches 10 and 11 are in phase-1, the inductor L is connected to supplies and is charged with current and, when both the switches 10 and 11 are in phase-2, the inductor current $I_L$ charges the output capacitor 12. The output voltage V versus input voltage $V_g$ as a function of duty cycle in this mode of operation is given by the equation (1):

$$\frac{V}{V_g} = \frac{D}{1-D} \quad (1)$$

Thus the converter is capable of achieving output voltages lower or higher than the input voltage.

Figure 2:
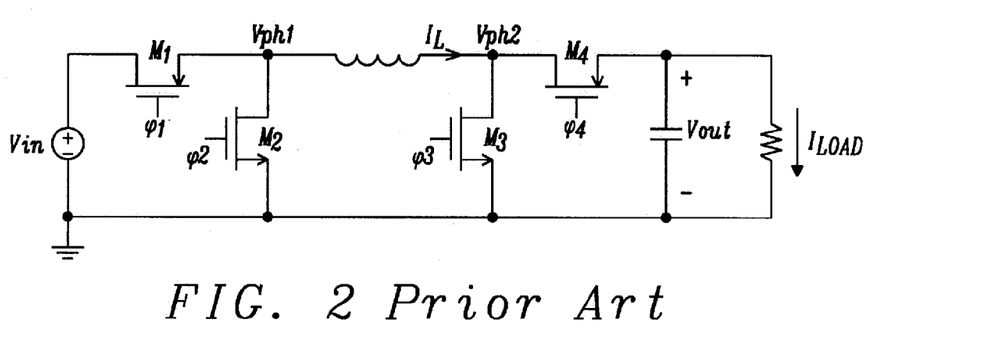
FIG. 2 prior art depicts a non-inverting buck-boost converter with integrated switches.

FIG. 2 prior art gives the topology of an output stage of a synchronous buck-boost controller with integrated switches.

Referring back to basic operation of FIG. 1 prior art, in phase-1 switches M1 and M3 will be ON; switches M2 and M4 will be OFF; and in phase-2 switches M2 and M4 will be ON and switches M1 and M3 will be OFF.

Comparing the basic Buck-Boost operation with a typical Buck or Boost converter, we can list the following disadvantages:

4 switches change state at each cycle, thus switching loss is 2 times that of a typical Buck or Boost converter
  The average inductance current is significantly higher than the load current, given as:

$I_L = I_{LOAD}/(1-D)$ (e.g. when D=0.5, $V_{in}=V_{out}$, $I_L = 2 \times I_{LOAD}$), which leads to
    an increase in inductor current
    increase in resistive losses (e.g. for D=0.5 example, losses due to the equivalent series resistance of the inductor ($R_{ESR,L}$) will be 4 times that of a Buck converter.)
  At phase-1 only the capacitor is sourcing the load, thus a low equivalent series resistance (ESR) of the capacitor is needed.
  Higher current ripple on the inductor.

The mentioned disadvantages can be reduced if we use separated Buck and Boost pulses, which means in a given cycle, either Buck switches M1 and M2 OR Boost switches M3 and M4 will be switching. During Buck mode switching M3 will be OFF and M4 will be ON, likewise during Boost mode switching M1 will be ON and M2 will be OFF.

An example of a Buck-Boost converter utilizing "separated Buck and Boost pulses" using voltage mode control is disclosed by U.S. Pat. No. 6,166,527 (to Trevor W. Barcelo).

Figure 3:
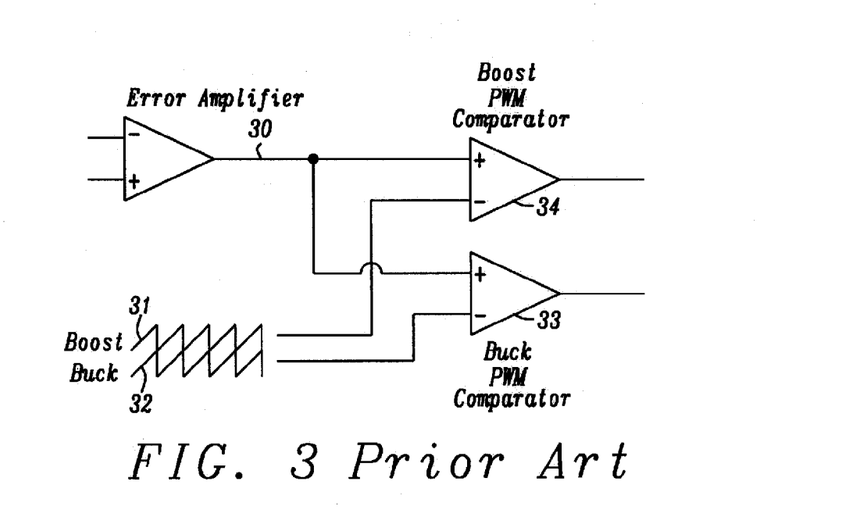
FIG. 3 prior art depicts a voltage mode control of a buck-boost converter.

FIG. 3 prior art shows this implementation, wherein the control voltage 30 is compared with two adjacent saw tooth signals wherein boost signal 31 is fed into boost comparator 34 and buck signal 32 is fed into buck comparator 33.

If the control voltage 30 is low, it will only be crossing the buck saw tooth signal 32 and only Buck switching will occur. Similarly if the control voltage is high, it will only be crossing the boost saw tooth signal 31 and only Boost switching will occur. An example of switching versus changing control voltage is given by FIG. 4a illustrating PWM pulse generation for buck and boost operation using one control signal $V_{ctrl}$ 40 and two saw tooth signals.

Figure 4A:
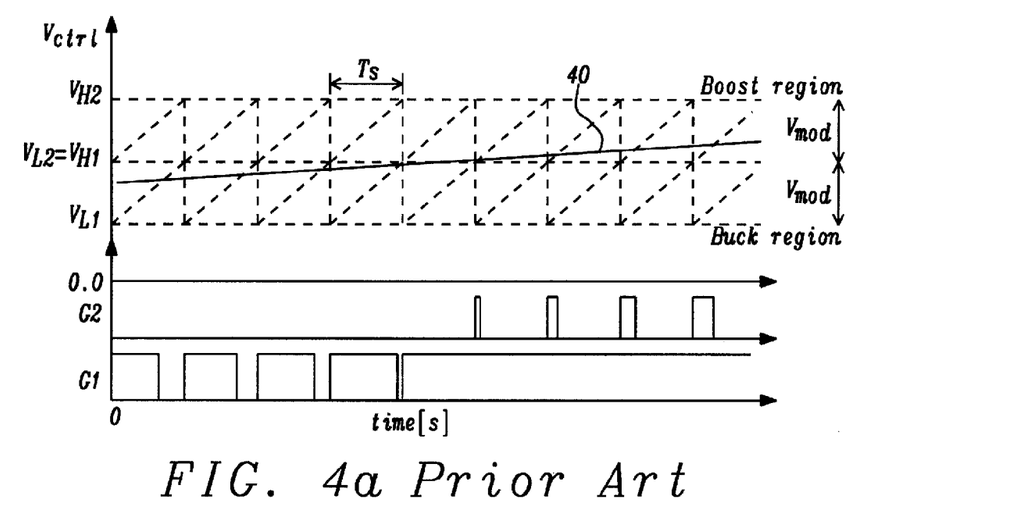
FIG. 4a prior art shows PMW pulse generation for buck and boost operation using one control signal and two saw tooth signals.
Figure 4B:
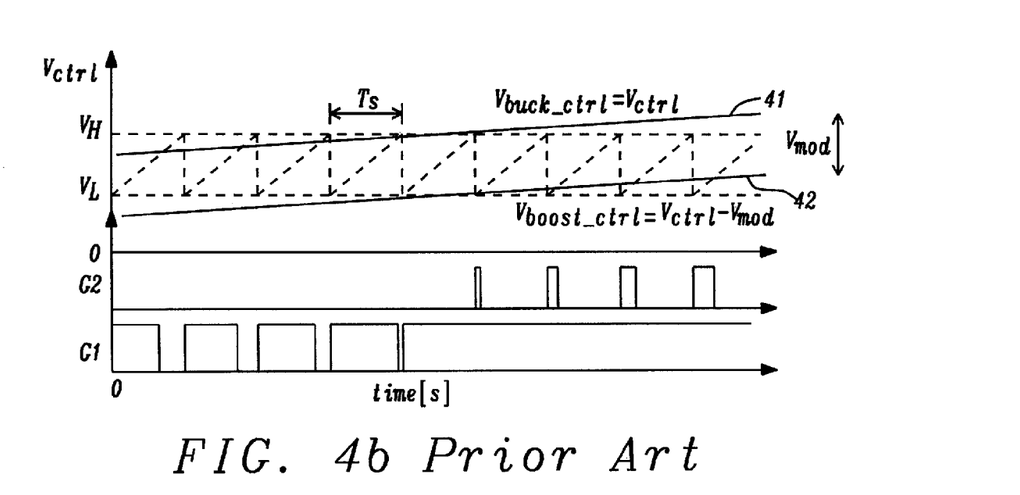
FIG. 4b prior art shows PMW pulse generation for buck and boost operation using two control signal and one saw tooth signal.

The following parameters are used in FIGS. 4a and 4b:
G1 is the buck switch control signal, which becomes low when the buck sawtooth crosses control voltage 40.
G2 is the boost switch control signal, which becomes low when the boost sawtooth crosses control voltage 42.
VLx and VHx are typically defined by design specifications—e.g. input voltage range.

A similar technique is using two-shifted control voltages and a single saw tooth signal, as illustrated in FIG. 4b illustrating PMW pulse generation for buck and boost operation using two control signals $V_{buck\_ctrl}$ 41 and $V_{boost\_ctrl}$ 42 and a single saw tooth signal. When the $V_{buck\_ctrl}$ 41 control signal crosses the saw tooth signal, Buck switching will occur, similarly when the $V_{boost\_ctrl}$ 42 control signal crosses the saw tooth signal, Boost switching takes place. In FIG. 4b the amplitude of the saw tooth signal is equal to the control voltage shift. Thus in a given cycle either a Buck or Boost switching will occur.

As in Buck or Boost converters, current mode control (CMC) can also be used in Buck-Boost converters. And though CMC is more desirable for most applications, it has serious challenges if separated Buck and Boost pulses are required.

There have been examples of current mode control (CMC) Buck-Boost converters utilizing separated Buck and Boost pulses as disclosed in (Ma, Yanzhao, Jun Cheng, and Guican Chen. "A high efficiency current mode step-up/step-down DC-DC converter with smooth transition." In ASIC (ASICON), 2011 IEEE 9th International Conference on, pp. 108-111. IEEE, 2011) and in (Ehrhart, Andreas, Bernhard Wicht, Moris Lin, Yung-Sheng Huang, Yu-Huei Lee, and Ke-Horng Chen "Adaptive Pulse Skipping and Adaptive Compensation Capacitance Techniques in Current-Mode Buck-Boost DC-DC Converters for Fast Transient Response").

In both examples above the decision on staying in the Buck region or in the Boost region is given by checking the duty cycle as e.g. in the Ehrhardt et al. publication changing from Buck to Boost mode is decided when $D_{Buck} > 90\%$ (in the next switching cycle, Boost switching will take place), and changing from Boost to Buck mode is decided when $D_{Boost} < 10\%$.

There is a serious disadvantage of changing modes with this technique, for example when changing from Buck mode to Boost mode, it will take significant time for the loop filter to settle to normal operation, which results in unacceptable output transients.

Furthermore another severe problem of prior art buck-boost converters is output voltage overshoot after mode changes.

SUMMARY

A principal object of the present disclosure is to reduce switching losses of buck-boost converters.

A further principal object of the disclosure is to reduce resistive losses of buck-boost converters.

A further object of the disclosure is to avoid requiring a low ESR capacitor only.

A further object of the disclosure is to reduce current ripple of an inductor current.

A further object of the disclosure is to avoid output voltage overshoot of a buck-boost converter.

Furthermore an objective of the disclosure is to achieve a fast mode change from buck to boost mode and vice versa hence avoiding unacceptable output transients.

Moreover an objective of the disclosure is utilizing a Buck/Boost mode decision method with continuous control voltage for Buck and Boost mode therefore eliminating transients in the control loop between modes.

Another object of the disclosure is to suppress sub-harmonic oscillation of the buck/boost converter.

In accordance with the objects of this disclosure a method to improve performance of buck-boost converters has been achieved. The method disclosed comprises the steps of: (1) providing a buck-boost regulator configured to current sensing and to generating a slope ramp for a buck-side comparator, comprising an error amplifier, a buck mode comparator, a boost mode comparator, means to generate a control voltage of a boost-side comparator, and means to generate a buck mode duty cycle, (2) utilizing current mode control for the buck-boost converter, (3) using separated buck mode and boost mode pulses, and (4) utilizing a buck-boost mode decision method with a continuous control voltage for both modes.

In accordance with the objects of this disclosure a buck-boost converter with improved performance capable of generating separate Buck and Boost pulses, operating with current mode control and having a continuous control signal has been achieved. The buck-boost converter disclosed firstly comprises: a circuitry capable of current sensing and slope ramp generation of a buck-side comparator, a circuitry capable of error amplification comprising a loop filter, generating a control voltage, and operating a compensation network, and a circuitry capable of controlling a boost side comparator in relation to a buck mode control voltage according to an equation: $V_{c,Boost}=V_{c,Buck}-\Delta V_c$, wherein $V_{c,Boost}$ is a boost mode control voltage, $V_{c,Buck}$ is a buck mode control voltage, and $\Delta V_c$ defines a reference threshold. Furthermore the buck-boost converter comprises a buck-side switching means capable of generating a buck duty cycle, a buck-side switch capable of generating buck pulses, and a circuitry capable of ensuring that the buck-side switch is ON during Boost mode. Moreover the buck-boost converter comprises a boost side switch capable of generating boost pulses, and a circuitry capable of sampling an output of said a buck-side switching means capable of generating a buck duty cycle in order to comparing the buck duty cycle with a reference buck duty cycle configured to decide whether a next pulse will be a Buck pulse or a Boost pulse.

BRIEF DESCRIPTION OF THE FIGURES

The invention is explained below in an exemplary manner with reference to the accompanying drawings, wherein FIG. 1 prior art shows a non-inverting buck-boost converter.

DETAILED DESCRIPTION

Methods and circuits are disclosed to achieve buck-boost converters with current mode control (CMC) and separated buck and boost pulses. If switching in buck mode and the buck duty cycle $D_{BUCK}$ is greater than a set reference duty cycle $D_{SET}$, then in the next cycle boost mode switching will occur. Typical values for the reference duty cycle $D_{SET}$ may be between about 80 and 90%, depending on system requirements.

Furthermore if switching in boost mode and $D_{Buck}<D_{set}$, then in the next cycle Buck mode switching will occur. It is possible to track Buck comparator output and the related duty cycle, which is not in effect during Boost mode operation. Thus mode change decision will only be dependent on a single input $D_{Buck}$.

Moreover the control loop of the buck-boost converters disclosed will incorporate a single loop filter and error amplifier, wherein control voltages for a buck comparator and a boost comparator will be related and defined with the following formula:

$$V_{c,Buck}=V_{c,Boost}+\Delta V_c$$

Detailed description of the proposed technique is given in the following next sections.

Figure 5A:
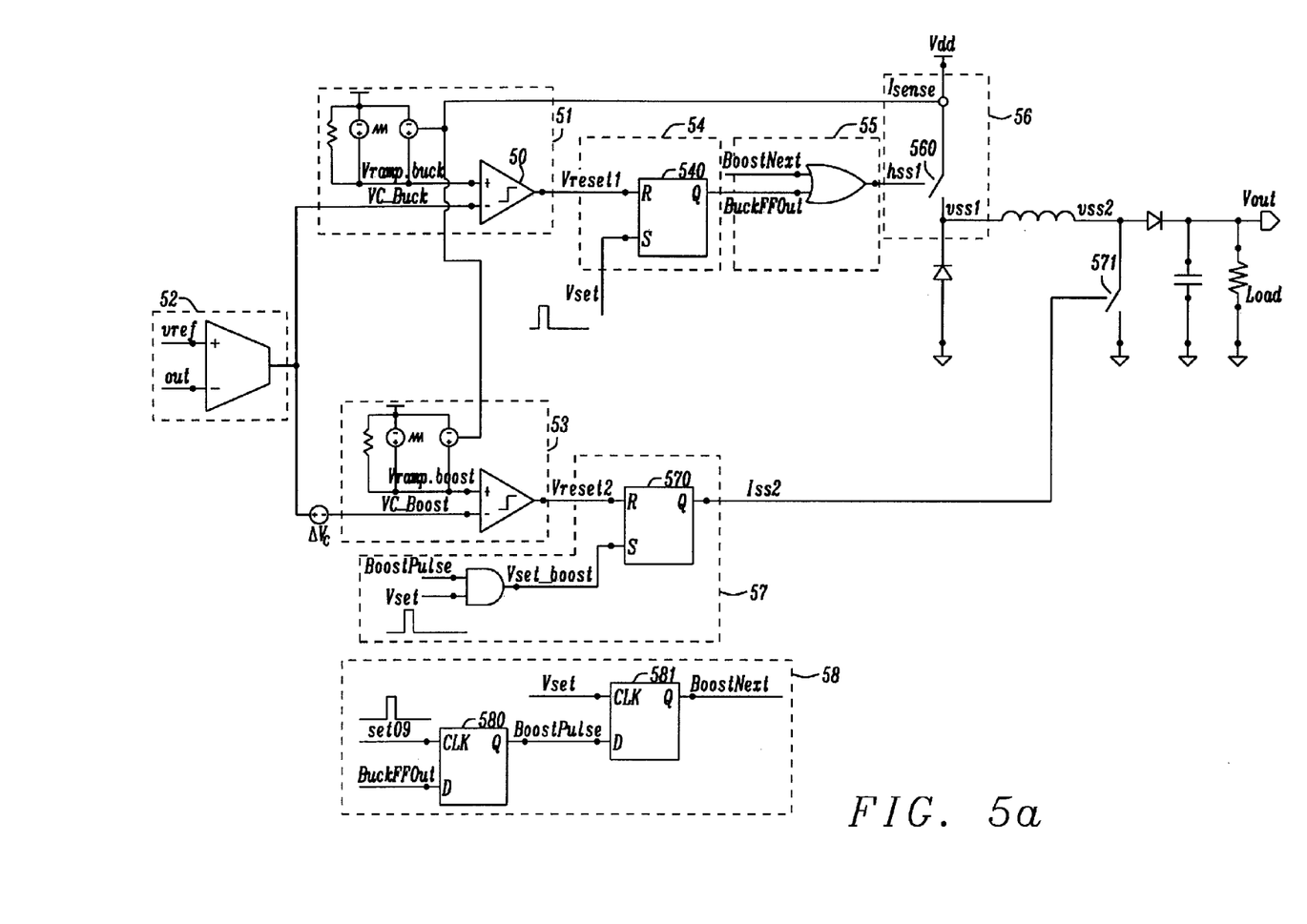
FIG. 5a shows a block diagram of a preferred embodiment of a buck-boost converter disclosed.

FIG. 5a shows a block diagram of the principal features of a preferred embodiment of the disclosure. The buck boost converter disclosed comprises circuitry 51 to input a current sense and slope ramp to a buck-side comparator 50, an error amplifier and compensation network 52, a circuitry 53 with the control voltage of Boost-side comparator, related to Buck control voltage with $V_{c,Boost}=V_{c,Buck}-\Delta V_c$, which is a key feature of the disclosure, a circuitry 54 with a Buck side set- and reset flip-flop (SR_FF) 540 to generate a Buck duty cycle, a circuitry 55 to ensure that a buck switch 560 is ON during Boost mode, a circuitry 56 for current sense and buck switch 560, a circuitry 57 for a Boost side reset-set flip-flop (RSFF) 570 to generate Boost duty cycle, a Boost switch 571 which is OFF during buck mode, and a circuitry 58 comprising two D-type flip-flops (FF) 580 and 581 to sample Buck FF output at points of time $t=D_{set}\cdot T$, (e.g. comparing buck duty cycle with 0.9, wherein T signifies the cycle period), and decide whether the next pulse will be a Buck pulse or a Boost pulse. RS flip flop 570 and D-type flip-flops 580 and 581 may alternately be other flip-flop types.

Figure 5B:
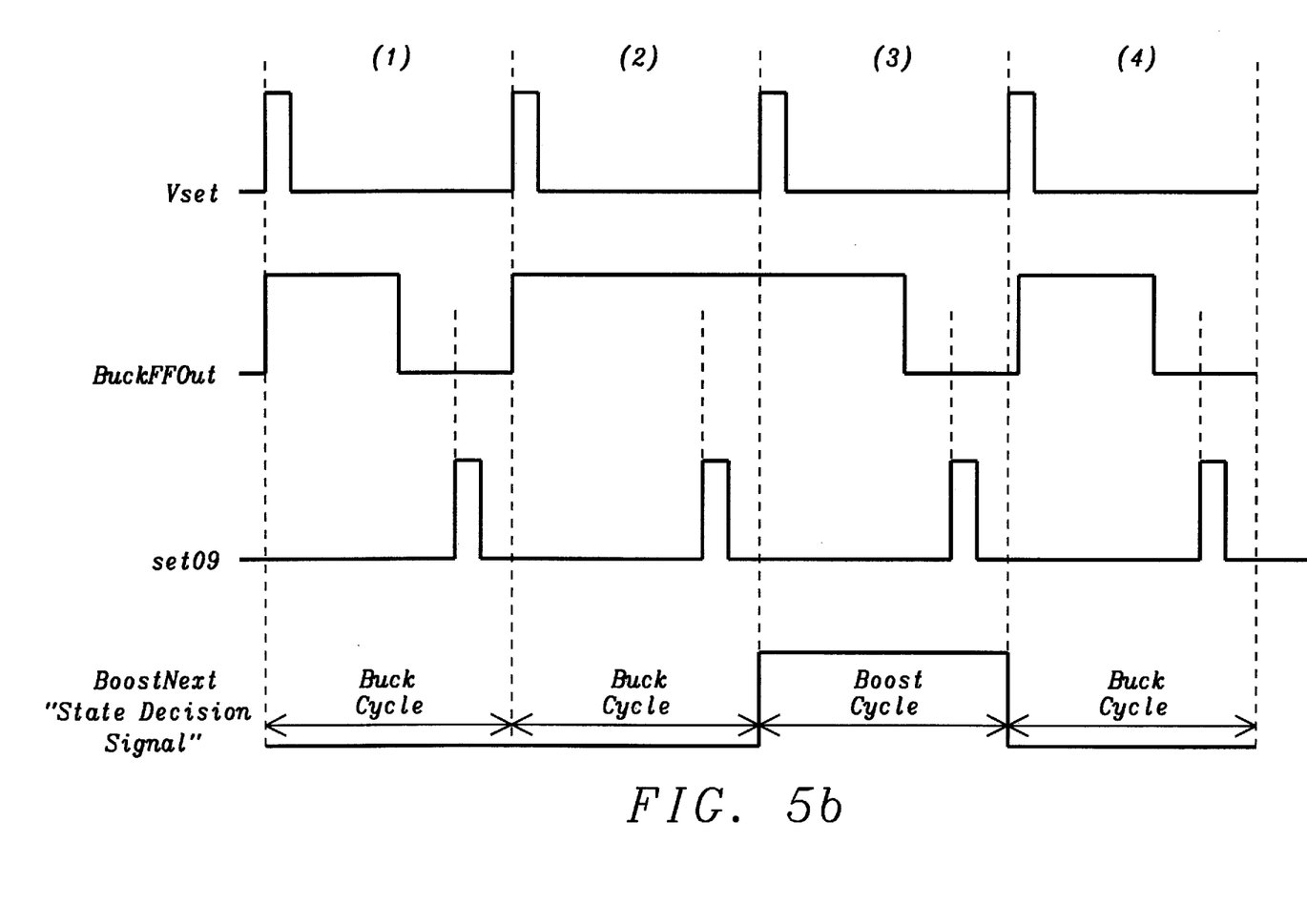
FIG. 5b shows a timing diagram of comparing the buck duty cycle with a reference to decide whether the next pulse will be a Buck pulse or a Boost pulse.

FIG. 5b shows a timing diagram of comparing the buck duty cycle with "set09" to sample "buck FFout" to decide whether the next pulse will be a Buck pulse or a Boost pulse.

Thus the system disclosed is capable of generating separated Buck and Boost pulses, operating with current mode control and having a continuous control signal.

The following paragraph explains a simple technique to define delta voltage $\Delta V_c$.

Assuming that the same control voltage has been generated for generation of a, for example, 90% duty cycle D for Buck and, again for example, 10% duty cycle D for Boost (another maximum duty cycle D for buck and minimum duty cycle D for Boost can be defined, as needed).

For current mode operation, at the time the Buck comparator changes output or when duty cycle D=0.9, in this example, $$V_{C,buck} = I_{sense,max,buck} R_{sense} + D_{buck} V_{ramp,buck}$$

$$I_{sense,max,buck} = I_{LOAD} + \frac{V_{in} - V_{out}}{L} D_{buck} T$$

and at the time the Boost comparator changes output or when duty cycle D=0.1, in this example $$V_{C,boost} = I_{sense,max,boost} R_{sense} + D_{boost} V_{ramp,boost}$$

$$I_{sense,max,boost} = \frac{I_{LOAD}}{(1-D_{boost})} + \frac{V_{in}}{L} D_{boost} T,$$

where T is the cycle period. For the mentioned conditions, and for the sake of simplicity, it has been assumed that the boost duty cycle $D_{boost}$ is close to 0 and Vin is close to Vout, $I_{sense,max}$ in Buck and Boost modes will be similar, and $$V_{C,buck} - V_{C,boost} = 0.9 V_{ramp,buck} - 0.1 V_{ramp,boost} = \Delta V_C$$

Thus we can relate both control voltages $V_{cbuck}$ and $V_{cboost}$, wherein voltage shift $\Delta V_C$ is implemented as a level shifter, e.g., as an ideal DC source in the block diagram of FIG. 5a. The DC voltage shift can be implemented in various ways, for example as an IxR voltage drop or employing a level shifter block in the block diagram of FIG. 5a.

Although other formulas can be utilized for $\Delta V_C$, a value far from optimal operation will create larger output voltage ripples when switching between modes which may lead to low frequency oscillation.

Figure 6:
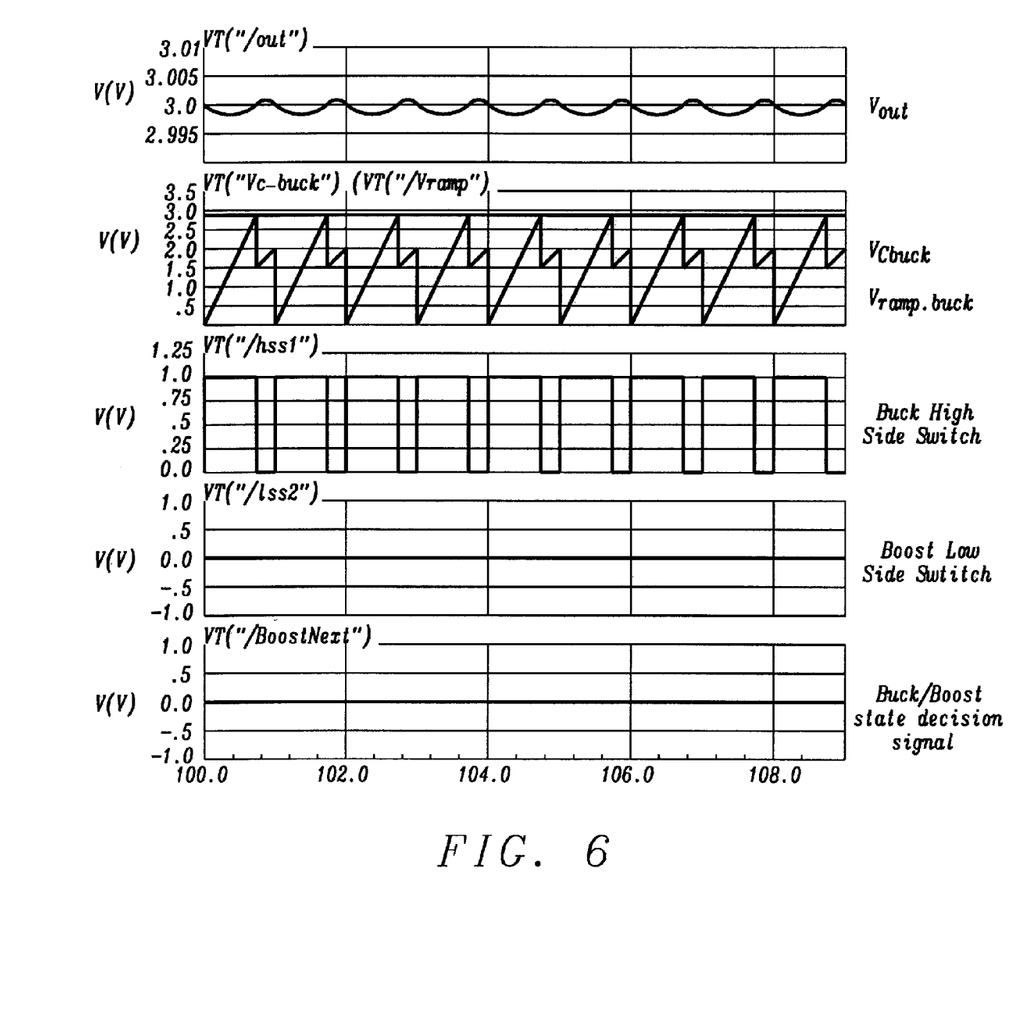
FIG. 6 illustrates simulation results of the buck-boost converter operating in buck mode.

FIG. 6 illustrates simulation results for input voltage Vin=4.5V, output voltage Vout=3V and load current $I_{LOAD}$=1 Å, switching frequency $f_{SW}$=1 MHz. Since Vin>Vout, the system works only in Buck mode, with duty cycle $D_{buck}$=0.76. As $D_{buck}$<0.9 the Boost Nextsignal (bottom in FIG. 5.) is logic zero, hence no Boost cycle is observed.

From top to bottom FIG. 6 shows the output voltage Vout, control voltage $V_{cbuck}$, $V_{rampbuck}$, the switching of the buck high side switch 560, of the boost low side switch 571 and the buck/boost state decision signal BoostNext. All these signals can be located in the block diagram of FIG. 5a. As mentioned above no boost cycle is observed.

Figure 7:
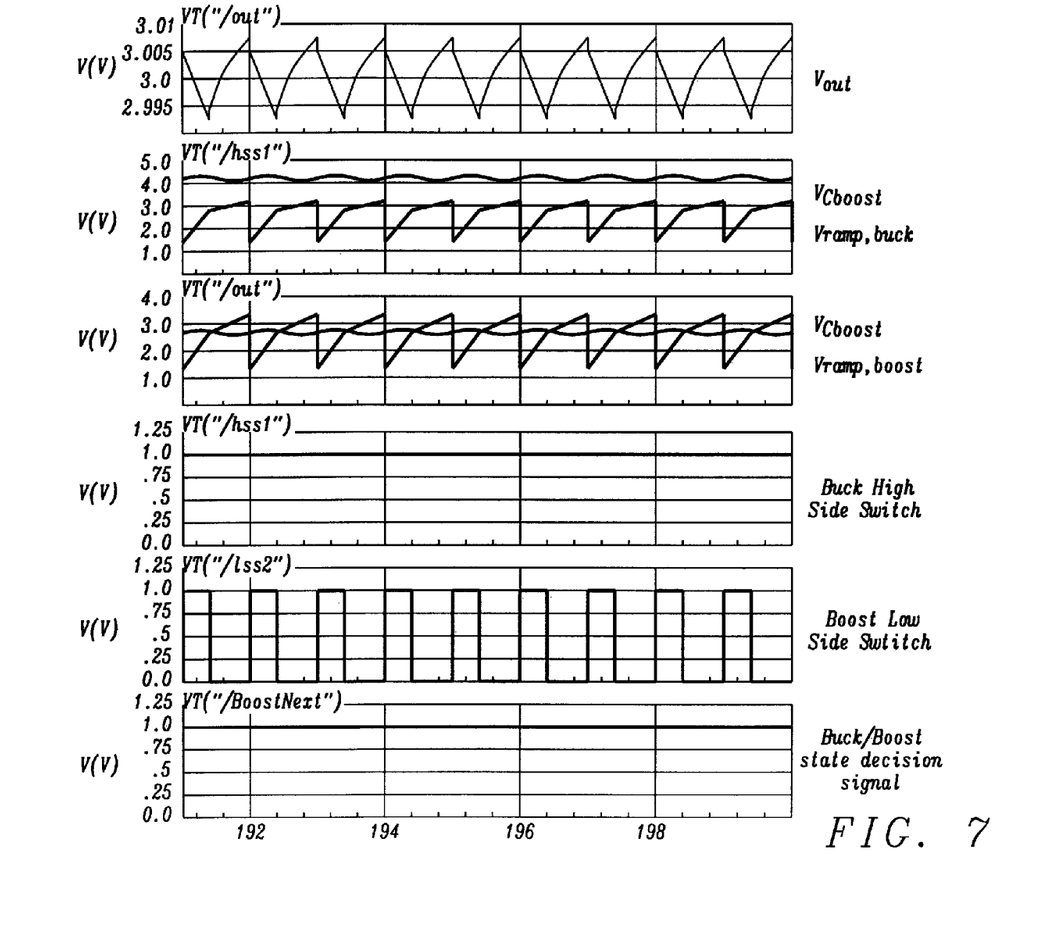
FIG. 7 shows simulation results of the buck-boost converter operating in boost mode.

FIG. 7 shows the simulation results for Vin=2.5V, Vout=3V and $I_{LOAD}$=1 Å. Vin<Vout and the system works only in Boost mode, with $D_{buck}$=1. As $D_{buck}$>0.9 the BoostNext signal (bottom in FIG. 5.) is always logic one, hence only Boost cycle is observed. During Boost mode, Buck high side switch is ON.

Figure 8:
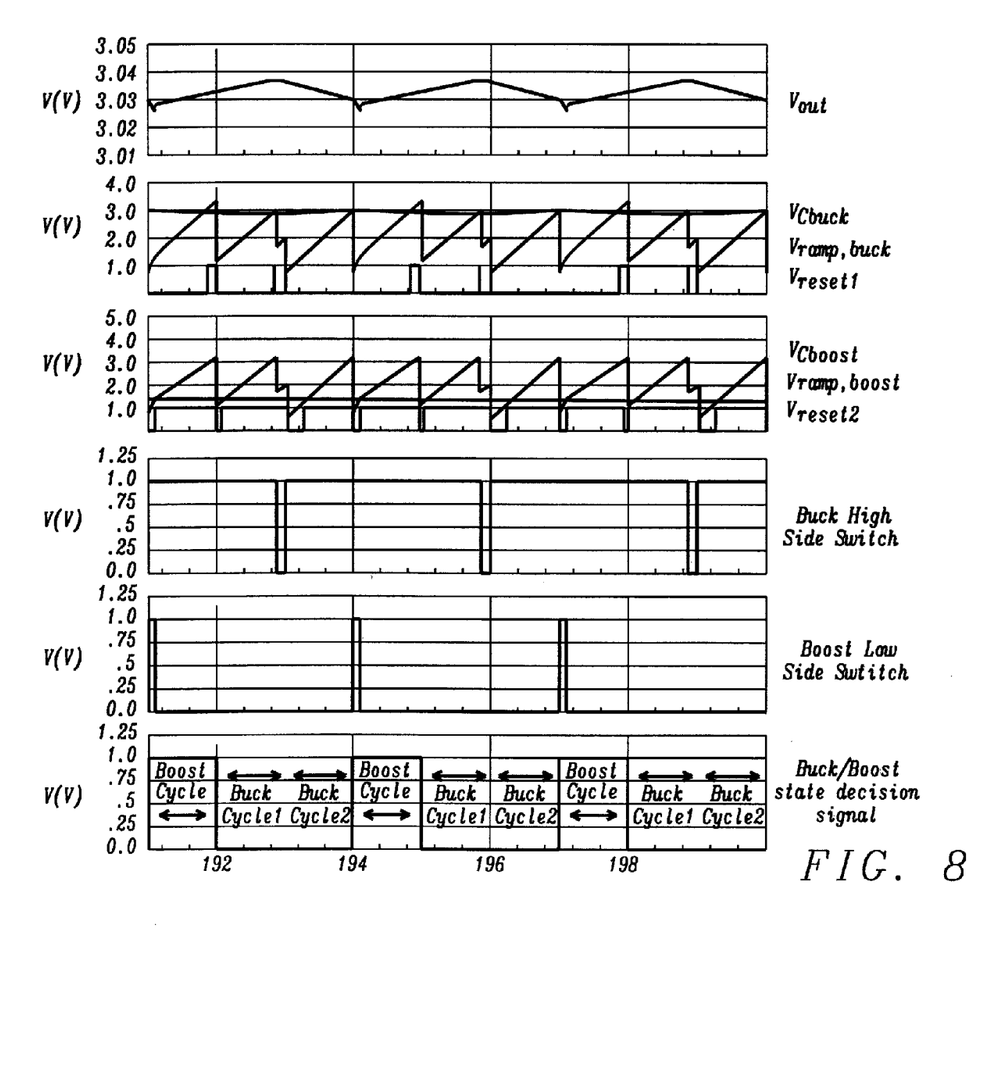
FIG. 8 illustrates simulation results for wherein Vin is close to Vout and separated Buck and Boost pulses are observed.

FIG. 8 shows the simulation results for Vin=3.5V, Vout=3V and $I_{LOAD}$=1 Å. This is the case where the method disclosed shows the improvement versus prior art for system operation.

Vin is close to Vout and separated Buck and Boost pulses are observed—in this case one Boost cycle is followed by two Buck cycles. The Buck/Boost cycle combinations may vary with different operating conditions.

At t=191 us (start of frame), a Boost cycle takes place. After −0.8 us (0.8×T, $f_{SW}$=1 MHz) $V_{Cbuck}$ crosses $V_{ramp,buck}$=1 and hence $V_{reset1}$ is set. $V_{reset1}$ is set when $V_{Cbuck}$ crosses $V_{ramp,buck}$ As $D_{buck}$<0.9 the next cycle is a Buck cycle. $V_{reset2}$ is reset when $V_{ramp,boost}$ is lower than $V_{cboost}$.

During this cycle $D_{buck}$=0.86 and the next cycle is also Buck. During the second Buck cycle D is 1 and the next cycle will be a Boost cycle.

Furthermore the circuit of FIG. 5a has the ability to suppress sub-harmonic oscillation. Buck-Boost converters encounter high duty cycle operation in Buck mode, which requires extreme values for slope compensation for CMC ($V_{in}$ is typically close to $V_{out}$). However with this topology a high duty cycle Buck will be followed by a low duty cycle Boost cycle, which will force the system back to non-subharmonic operation.

Figure 9:
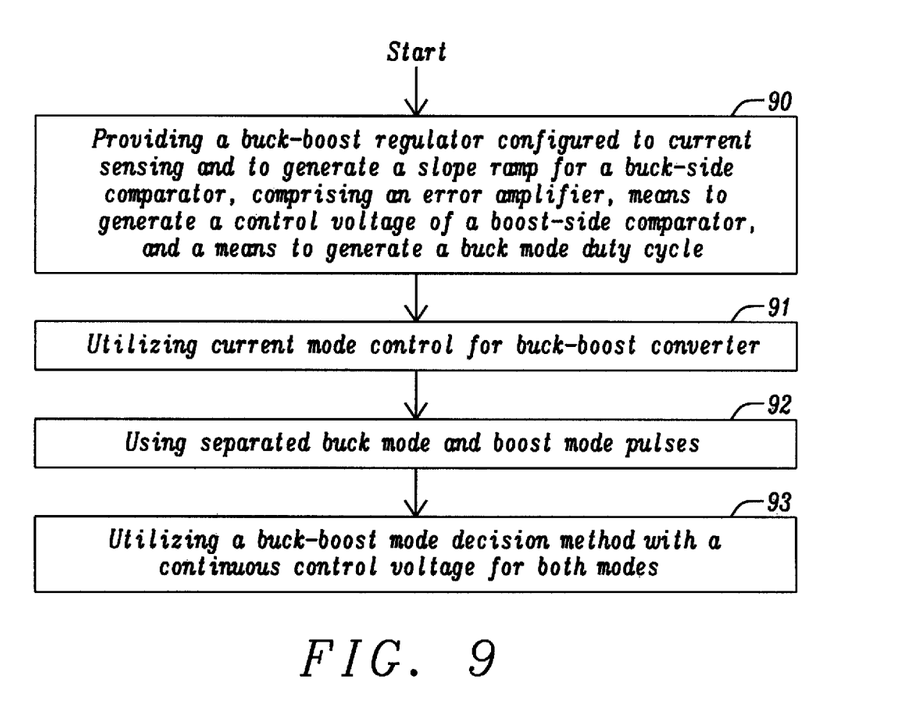
FIG. 9 shows a flowchart of a method to improve the performance of buck-boost converters.

FIG. 9 shows a flowchart of a method to improve buck-boost regulator performance.

A first step 90 depicts a provision of a buck-boost regulator configured to current sensing and to generate a slope ramp for a buck-side comparator, comprising an error amplifier, means to generate a control voltage of a boost-side comparator, and means to generate a buck mode duty cycle. The next step 91 shows utilizing current mode control for the buck-boost converter. The following step 92 describes using separated buck mode and boost mode pulses and the last step 93 depicts utilizing a buck-boost mode decision method with a continuous control voltage for both modes.

While the invention has been particularly shown and described with reference to the preferred embodiments thereof, it will be understood by those skilled in the art that various changes in form and details may be made without departing from the spirit and scope of the invention.

What is claimed is:

1. A method to improve performance of buck-boost converters, the method comprising the steps of:

(1) providing a buck-boost regulator configured for current sensing and for generating a slope ramp for a buck-side comparator, comprising an error amplifier, configured to compare an output voltage of the buck-boost converter with a reference voltage, a buck mode comparator, a boost mode comparator, circuitry to generate a control voltage of a boost-side comparator, and circuitry to generate a buck mode duty cycle, wherein an arrangement of switches is configured to operate the buck-boost converter either in buck mode or in boost mode, wherein buck mode pulses drive the arrangement of switches in buck mode and boost mode pulses drive the arrangement of switches in boost mode;

(2) utilizing current mode control for the buck-boost converter;

(3) using separated buck mode and boost mode pulses, wherein, if the buck-boost converter is switching in buck mode and a duty cycle in buck mode is higher than a defined duty cycle, then in a next cycle boost mode switching will occur and wherein, if the buck-boost converter is switching in boost mode and a buck mode duty cycle is lower than a defined duty cycle, then in a next cycle buck mode switching will occur, wherein the buck-boost converter is configured to track an output of the buck comparator and a related buck mode duty cycle during boost mode operation and thus enable a mode change decision being only dependent on a single input; and (4) utilizing a buck-boost mode decision method with a continuous control voltage for both modes wherein control voltages $V_{c\_buck}$ for the buck comparator and $V_{C,Boost}$ for the boost comparator are related and are defined by generating the boost mode control voltage $V_{c,Boost}$; based on the buck mode control voltage $V_{c,Buck}$, according to an equation: $V_{c\_buck}=V_{c\_boost}+\Delta Vc$, wherein $\Delta Vc$ signifies a difference between buck mode and boost mode control voltages.

2. The method of claim 1, wherein the control voltage is an output of the error amplifier.

3. The method of claim 1, wherein the defined duty cycle is in a range of about 80% to 90%.

4. The method of claim 1, wherein $\Delta V_c$ is set according to an equation:

$$\Delta Vc = 0.9 V_{ramp,buck} - 0.1 V_{rampboost}$$

wherein $V_{ramp,buck}$ is a voltage set for buck mode slope ramp generation and $V_{rampboost}$ is a voltage set for boost mode slope ramp generation.

5. The method of claim 1, wherein $\Delta Vc$ is generated by a level shifter.

6. The method of claim 1, wherein by establishing that a high duty buck cycle is followed by a low duty boost cycle the buck/boost converter is forced back to non-subharmonic operation.

7. A buck-boost converter with improved performance configured to generate separated Buck mode and Boost mode pulses, operating with current mode control and having a continuous control signal, comprising:

circuitry configured for current sensing and slope ramp generation providing a first input to a buck-side comparator, wherein a circuitry configured for error amplification and network compensation provides a control voltage $V_{C,Buck}$ as second input to the buck-side comparator, and wherein an output of the buck-side comparator provides a reset input to a buck-side switching circuit configured to generate a buck duty cycle;

said circuitry configured for error amplification comprising a loop filter, generating a buck mode control voltage $V_{c,buck}$ control voltage, and operating a compensation network, wherein said circuitry configured for error amplification has inputs and an output, wherein a first input is a reference voltage, a second input is an output voltage of the buck-boost converter;

said buck-side comparator;

a circuitry configured for controlling a boost side comparator in relation to the buck mode control voltage $V_{c,Buck}$ by generating a boost mode control voltage $V_{c,Boost}$, based on the buck mode control voltage $V_{c,Buck}$, according to an equation:

$V_{c,Boost}=V_{c,Buck}-\Delta V_c$, wherein $V_{c,Buck}$ is the buck mode control voltage, and $\Delta V_c$ defines a voltage shift, wherein the circuitry configured for controlling the boost side comparator has an input and an output, wherein the input is the buck mode control voltage Vc,Buck and the output is the boost mode control voltage $V_{c,Boost}$, which is a second input to the boost side comparator;

said boost side comparator, wherein a boost-side circuitry configured for current sensing and slope ramp generation provides a first input to the boost-side comparator and an output of the boost side comparator is a reset input to a boost-side switching circuit configured to generate a boost duty cycle;

said buck-side switching circuit configured to generate a buck duty cycle, wherein a set input of the buck-side switching circuit activates the generation of the buck duty cycle and an output of the buck-side switching circuit BuckFFOut is a first input to a circuit configured to ensure that a buck-side switch is ON during boost mode;

wherein said buck-side switch is configured to generate buck mode pulses;

wherein said circuitry is configured to ensure that the buck-side switch is ON during Boost mode, wherein a signal BoostNext is a second input;

wherein said boost-side switching circuit is configured to generate a boost duty cycle, wherein a set input of the boost-side switching circuit activates the generation of the boost duty cycle and an output of the boost-side switching circuit controls a boost side switch;

wherein said boost switch is configured to generate boost mode pulses, wherein the boost switch is OFF during buck mode; and wherein a circuitry is configured to sample the output BuckFFOut of said buck-side switching circuit, is configured to generate a buck duty cycle in order to compare the buck duty cycle with a reference buck duty cycle, and is configured to decide whether a next pulse will be the Buck mode pulse or the Boost mode pulse, wherein an output of the circuitry configured to sampling the output BuckFFOut is the signal BoostNext.

8. The buck-boost converter of claim 7, wherein the buck side switching means is configured to generate the buck duty cycle is a flip-flop.

9. The buck-boost converter of claim 7, wherein $\Delta V_c$ is set according to an equation:

$$\Delta Vc = 0.9 V_{ramp,buck} - 0.1 V_{rampboost}$$

wherein $V_{ramp,buck}$ is a voltage set for buck mode slope ramp generation and $V_{rampboost}$ is a voltage set for boost mode slope ramp generation.

10. The buck-boost converter of claim 7, wherein $\Delta V_c$ is generated by a level shifter.

11. The buck-boost converter of claim 7, wherein buck-side switching circuit is a flip-flop.

12. The buck-boost converter of claim 7, wherein said circuitry is configured to sample an output of said a buck-side switching means comprising two flip-flops wherein a Q-port of a first flip-flop is connected to a D-port of a second flip-flop.

13. The buck-boost converter of claim 7, wherein said circuitry configured to ensure that the buck-side switch is ON during Boost mode comprises a logic OR-gate.

* * * * *